(12) United States Patent
Davis et al.

(10) Patent No.: US 6,314,177 B1
(45) Date of Patent: Nov. 6, 2001

(54) COMMUNICATIONS HANDLING CENTER AND COMMUNICATIONS FORWARDING METHOD USING AGENT ATTRIBUTES

(75) Inventors: Sheldon Joseph Davis, Guelph; Michael P. Montemurro, Toronto, both of (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/217,896

(22) Filed: Dec. 22, 1998

(51) Int. Cl.[7] .............................. H04M 3/523; H04Q 3/64
(52) U.S. Cl. ........................ 379/265.12; 379/265.13; 379/266.02; 379/266.05
(58) Field of Search .................................. 379/214, 265, 379/266, 309, 214.01, 265.01, 265.02, 265.12, 265.13, 266.01, 266.02, 266.05

(56) References Cited

U.S. PATENT DOCUMENTS 5,206,903    4/1993    Kohler et al. ................... 379/309
5,335,269  * 8/1994   Steinlicht ........................ 379/265

* cited by examiner

Primary Examiner—Harry S. Hong

(57) ABSTRACT

A communications handling center in which agents are assigned to handling queues for handling incoming communications, and handling attributes are assigned to the agents, is disclosed. The center forwards incoming communications, such as telephone calls, by determining handling requirements, including an appropriate handling queue and required agent attributes. An available agent within a queue is first located, and then an assessment is made whether that agent possesses required attributes in order to handle the communication. If so, the call is forwarded to the located agent. Preferably, the assigned agent attributes are relevant to all queues to which the agent may be assigned, allowing for the easy administration of the communications handling center, by reducing the number of queues that must be maintained.

12 Claims, 6 Drawing Sheets

AGENTS →

| LAST NAME | FIRST NAME | AGENT NUMBER | DEPARTMENT | LANGUAGE | ... | COMMENTS |
|---|---|---|---|---|---|---|
| SMITH | JOHN | 4 | SALES | ENGLISH | ... | |
| DOE | JANE | 1 | SERVICE | ENGLISH | | |
| TESTER | RALPH | 2 | DEPARTMENT 2 | ENGLISH | | |
| HARRISON | KIM | 3 | SALES | ENGLISH | ... | |
| ... | | | ... | ... | | |

| AGENT NUMBER | PRINTERS | MONITORS | MODEMS | MOTHER BOARDS | ... |
|---|---|---|---|---|---|
| 1 | 1 | 3 | 49 | 2 | |
| 2 | 49 | 1 | 49 | 0 | |
| 3 | 0 | 2 | 1 | 49 | |
| 4 | 2 | 0 | 3 | 1 | |
| ... | | | | | |

QUEUE →

AGENTS →

FIG. 4

| AGENT NUMBER | ENGLISH | FRENCH | GERMAN | CANADA | USA | ENGLAND | ... |
|---|---|---|---|---|---|---|---|
| 1 | 1 | 1 | 0 | 1 | 0 | 0 | |
| 2 | 1 | 0 | 0 | 1 | 1 | 1 | |
| 3 | 1 | 0 | 1 | 1 | 1 | 1 | |
| 4 | 1 | 1 | 0 | 1 | 1 | 1 | |
| ... | ... | ... | ... | ... | ... | ... | |

FIG. 5

COMMUNICATIONS HANDLING CENTER AND COMMUNICATIONS FORWARDING METHOD USING AGENT ATTRIBUTES

FIELD OF THE INVENTION

The present invention relates to communications handling centers, such as telephony call centers, and more particularly to communications handling centers that forward incoming communications using agent attributes, and to methods used by such centers.

BACKGROUND OF THE INVENTION

Communications handling centers, such as telephone call centers, forward incoming communications, such as telephone calls, for processing by one of several associated call handling personnel or "agents". Other communications centers may be used to forward voice-over-internet protocol ("VoIP") communications; electronic mail messages; facsimiles or the like, to associated handling agents.

Telephony call centers, for example, are often used to dispatch emergency services; as telemarketing sales centers; as customer service centers; or otherwise to automatically distribute received calls. Each incoming call (a communication) has a number of handling requirements, depending on, for example, the nature of the call, the originating call area, and the language of the call. Agents, on the other hand, each have abilities to process calls having certain handling requirements. Typically, agents are able to process one or more call types. For example, agents are typically trained to process certain call subject matters and certain call languages.

In known telephony call centers, computerized communications center equipment places incoming telephone calls, of a particular type, requiring defined skills, in queues of like calls. Appropriate agents have skills necessary to process calls in the queues, and are assigned to such queues. Agents are often assigned to multiple queues, reflective of their particular handling skills. Typically, this is done to increase the handling capacity of the center by making improved use of available communications handling resources.

Quite often, agents may handle calls related to one or more subject areas, and possess varied attributes that are relevant to all subject areas they are capable of handling. For example, a telephone call center agent may speak multiple languages, and may therefore be able to process telephone calls relating to a particular subject matter in all these languages. One simple approach used to deal with multiple agent attributes is to create and administer individual queues, each of which takes into account the subject matter and the attributes of the agent. For example, if an agent is capable of handling service calls in French and English, a call center may be configured to maintain call queues "Service-English"; and "Service-French". This, however, is administratively very cumbersome.

Other known telphony call centers use agent-skill indicators, associated with agents in order to connect calls. In such centers, a call is connected to an agent having an agent-skill indicator matching that of the call, within an administrative group of agents known groups as a "split". Agents, however, are typically only assignable to single splits, and typically only a single agent-skill indicator is used to connect the call. Disadvantageously, such call centers do not use agent attributes across "splits". This may lead to an inefficient utilization of call center resources. Moreover, these communications handling centers do not allow for the easy administration and re-assignment of agents to queues, while maintaining agent skill-sets.

Accordingly, an improved communications handling center that forwards incoming communications based on queues and agent attributes is desirable.

SUMMARY OF THE INVENTION

In accordance with the present invention, agents within a communications handling center, such as a telephone call center, are assigned to handling queues. Additionally, communications handling attributes are assigned to the agents. Communications, such as incoming telephone calls, are forwarded to agents by determining handling requirements, including an appropriate handling queue and required handling attributes. An available agent within a queue is first located, and then an assessment is made whether that agent possesses required attributes in order to handle the communication. If so, the call is forwarded to the located agent.

Preferably, the assigned agent attributes are relevant to all queues to which the agent may be assigned. Advantageously, then, the agent attributes are used to filter incoming communications. Accordingly, fewer queues must be administered, and agents may be re-assigned to call handling queues, without re-assigning agent attributes.

Other aspects, features and advantages of the present invention will become apparent to those of ordinary skill in the art upon review of the following description of specific embodiments of the invention in conjunction with the accompanying figures.

BRIEF DESCRIPTION OF THE DRAWINGS

In figures which illustrate preferred embodiments of the invention,

FIG. 3 illustrates an exemplary organization of an agent definition data portion of the memory illustrated in FIG. 2;

FIG. 4 illustrates an exemplary organization of an agent/queue assignment data portion of the memory illustrated in FIG. 2;

FIG. 5 illustrates an exemplary organization of an agent attribute data portion of the memory of FIG. 2.

DETAILED DESCRIPTION

The preferred embodiment of the invention will be described in the context of a telephony call center interconnected with the public switched telephone network (the "PSTN"), a person skilled in the art will appreciate that the invention may be used in analogous communications handling centers. For example, the invention may be used as part of a a Voice-over-Internet-Protocol ("VoIP") call center server connected with a packet switched data network; as part of an internet multimedia message response center; as part of an electronic mail response center; a facsimile server; or the like.

Figure 1:
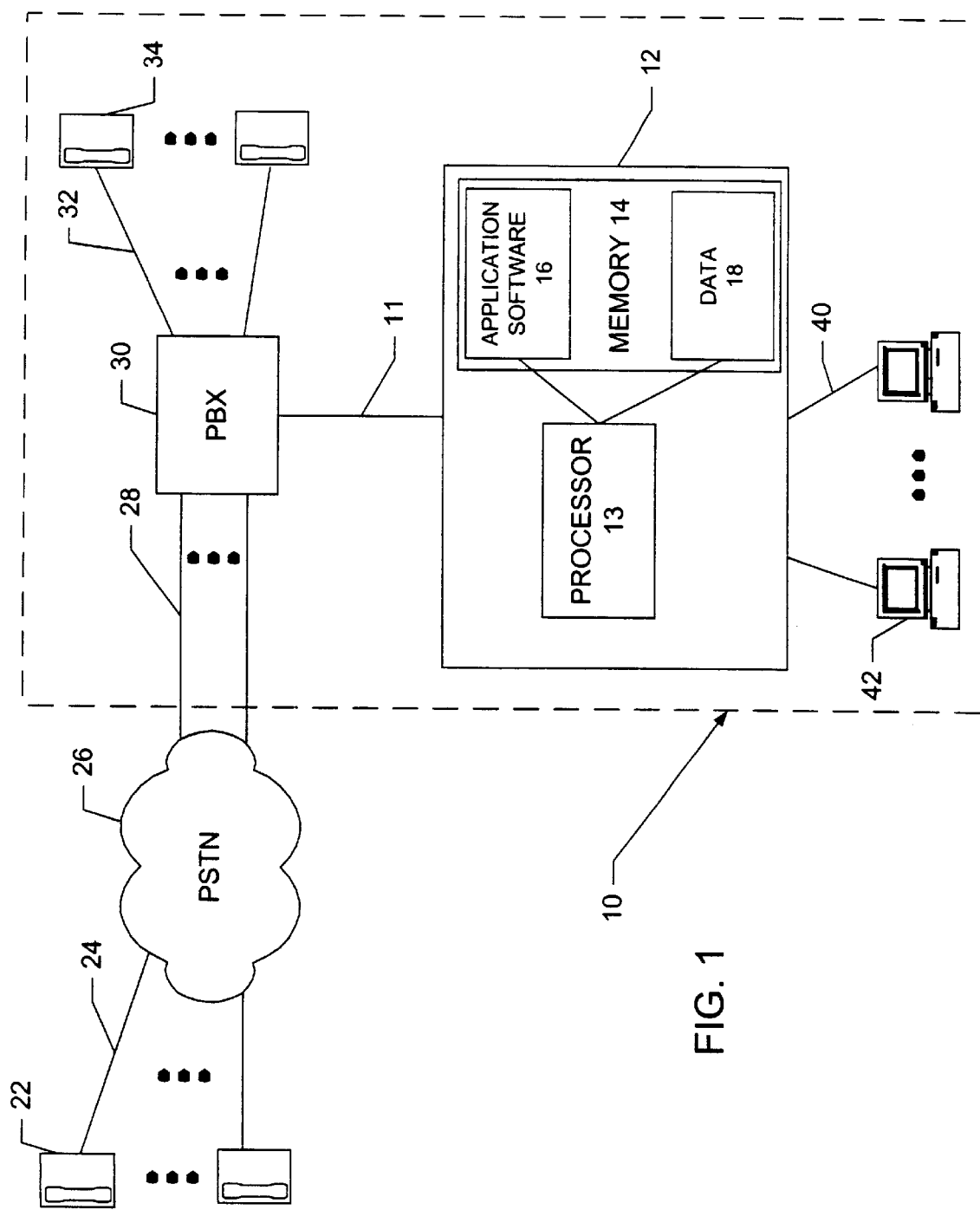
FIG. 1 is a block diagram of a communications system including a communications handling center, exemplary of a preferred embodiment of the present invention.

FIG. 1 accordingly illustrates a call center 10 acting as an automated communications handling center, exemplary of a preferred embodiment of the present invention. Example call center 10 comprises a call center server 12; a private branch exchange telephone switch 30 ("PBX") interconnected to server 12 by link 11; administrative terminals 42 interconnected by links 42 to server 12; and agent stations 34 interconnected with PBX 30 by links 24.

PBX 30, and hence call center 10, is further interconnected with the PSTN 26 by telephone trunks 28. Callers having conventional telephones 22 or similar equipment are also interconnected with PSTN 26 by telephone lines 24.

Example call center server 12 may be a conventional NORTEL NETWORKS SYMPOSIUM call center server, adapted in accordance with the present invention. As such, call center server 12 is preferably a conventional microprocessor based computing device, such as a conventional INTEL X86 based computer. PBX 30 may similarly be a conventional NORTEL NETWORKS MERIDIAN PBX. PBX 30 could alternatively be replaced with any other suitable telephony switch which could form part of PSTN 26.

As further illustrated in FIG. 1, call center server 12 comprises a processor 13 interconnected with computer readable memory 14. Additionally, interconnected with processor 13 are one or more interfaces (not illustrated), permitting server 12 to communicate with terminals 42 and PBX 30. Processor 13 is preferably a conventional microprocessor, such as an INTEL X86 family microprocessor, while memory 14 is any suitable combination of RAM, ROM, or other solid state, magnetic or optical memory. As detailed below, memory 14 stores computer operating system software; application software 16; and data 18 adapting an otherwise conventional computing device to act as call center server 12.

Terminals 42 are also preferably conventional computing devices, such as INTEL X86 based computers, comprising one or more conventional operator input devices such as a keyboard, mouse, and display. Most preferably, terminals 42 are capable of presenting users, typically supervisors, a graphical user interface ("GUI"), displaying call center information and statistics and allowing configuration of the call center 10. Accordingly, each terminal 42 may store and execute client versions of software, running under a computer operating system, such as for example, MICROSOFT WINDOWS 95 or NT, providing a suitable GUI. As will be appreciated, terminals 42 could alternatively be conventional text-based display terminals such as DEC VT100 terminals, or the like.

Communications handling agents (eg. call handling agents) are stationed at agent stations 34, in order to process incoming communications (eg. telephone calls). Thus, agent stations 34 may be conventional telephones. Typically, agent stations 34 will further comprise user or agent terminals (not shown) for displaying call related information to agents at stations 34.

Figure 2:
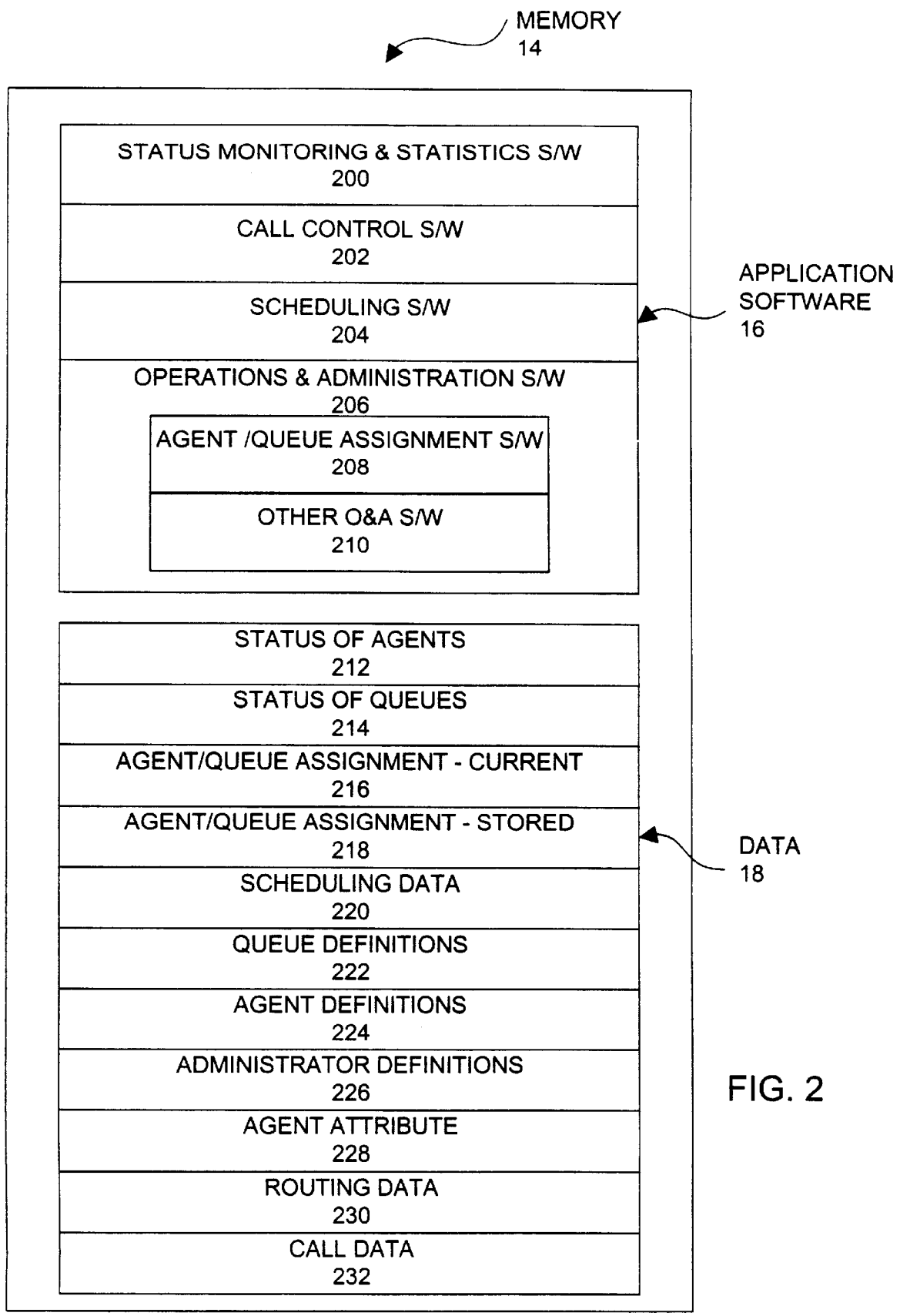
FIG. 2 is a block diagram illustrating exemplary organization of memory in the communications handling center illustrated in FIG. 1.

FIG. 2 illustrates an example organization of software blocks or routines forming part of application software 16 within memory 14, and data 18 resulting from, or controlling application software 16, also stored within memory 14. As will be appreciated, machine executable versions of application software 16 is actually stored within memory 14. As well, executable version of operating system software, such as the UNIX operating system, or MICROSOFT WINDOWS or WINDOWS NT software is also preferably stored within memory 14, but not illustrated.

Application software 16 may be formed using programming techniques, development tools and libraries known to those skilled in the art. As illustrated, exemplary application software 16 may be organized in functional blocks including status monitoring and statistics generating software block 200; call control software block 202; scheduling software block 204; operations and administration ("O&A") software block 206 including agent/queue assignment software block 208; and other O&A software block(s) 210. Application software 16 adapts call center server 12 to function in accordance with methods exemplary of the present invention.

As such, application software 16 maintains data 18 within memory 14. Data 18 includes agent status data 212; queue status data 214; agent/queue assignment (current) data 216; future agent/queue assignment (stored) data 218; scheduling data 220; queue definition data 222; agent definition data 224; administrator definition data 226; agent attribute data 228; routing data 230; and call data 232. Data 212, 214, 216, 218, 220, 222, 224, 226, 228, 230 and 232 are typically data sets or structures created and maintained by application software 16 within memory 14. As well, data 216, 218, 220, 222, 224, 226, 228, 230 and 232 may be modified as required by a call center administrator at terminals 42.

Agent status data 212, is typically a data set that is dynamically updated and has entries for each agent indicating whether that agent is currently occupied with a communication, such as a call; how long the agent has been occupied with a call; and other relevant agent statistics, known to those skilled in the art.

Status of queues data 214 is similarly a data set, with dynamically updated entries indicating how many (if any) calls in a particular queue (ie. calls of a certain call type) are currently held at PBX 30 (FIG. 1); the length of time calls have been held; and other information known to those skilled in the art.

Agent/queue assignment (current) data 216 is typically a data set having entries indicating current agent to queue assignments and priorities as detailed below.

Agent/queue assignment (stored) data 218 is similarly a data set storing sets of agent to queue assignment and priorities to be assigned at future times.

Scheduling data 220 is typically a data set containing data indicating times at which stored future agent to queue assignment data sets are to be transferred from agent/queue assignment (stored) data 218 to agent/queue assignment (current) data 216.

Queue definition data 222 is a data set defining various call types processed in queues at call center 10 (FIG. 1) and includes ASCII text identifiers of the queues. As noted, each queue relates to a particular call type to be processed at call center 10 and requiring specific call processing skills. Queue definition data 222 may be modified by an administrator at terminal 42 in order to configure call center 10 to process specific queues, as required.

Administrator definition data 226 is a data set containing preferences and information about administrators that may log into terminals 42.

Routing data 230 contains data sets defining routing information from incoming communications to agent stations 34. Routing data 230 may, for example, contain simple mapping data or more complex scripting information defining how call center server 12 routes calls received at PBX 30 to agent stations 34.

Call data 232 is also dynamically updated and represents information about calls received at PBX 30, possibly including time of call information, length of call, type (queue) of call, or other relevant call information known to those skilled in the art.

Call control software block 202 adapts call center server 12 to route incoming calls received at PBX 30 to agent stations 34 using data 18 within memory 14.

O&A software block 206 is wholly or partially responsible for adapting call center server 12 to display user definable system parameters on terminals 42. Further O&A software block 206 allows for the variation of data stored within data memory 14 by way of terminals 42. For example, O&A software block 206 allows for the variation of agent/queue assignment (current) data 216; agent/queue assignment (stored) data 218; scheduling data 220; agent definitions data 224; and administrator definition data 226. Moreover, scheduling software block 204 further allows for the automated adjustment of agent/queue assignments with time, in accordance with pre-programmed schedules based on agent/queue assignment (stored) data 218 and scheduling data 220. Finally, status monitoring and statistics software block 200 collects data about incoming calls, queues and agents for statistical purposes and for display by O&A software block 206 and stores them as call data 230, status of queue data 214 and status of agents data 212 in memory 14.

An exemplary organization of a portion of agent data 224 is illustrated in FIG. 3. As illustrated agent data 224 is preferably organized as a two-dimensional array, including row entries associated with agents, with column entries containing data relevant to each agent. For illustration purposes, example row entries for only four agents are illustrated. As illustrated data 224 preferably contains for each agent, ASCII or UNICODE data identifying the agent's name; a logical agent number; ASCII or UNICODE data identifying the agent's department; an identifier of the agent's default language; additional comments; and other relevant information. As will be appreciated, the example data 224 illustrated in FIG. 3 is not exhaustive, and could contain more or less information relating to each agent without departing from the requirements of the present invention.

As noted, also stored within memory 14 is agent/queue assignment (current) data 216. An exemplary organization of a portion of data 216 is illustrated in FIG. 4. For clarity, data relating to the four agents illustrated in FIG. 3, and four example queues, is illustrated. As illustrated, data 216 also preferably takes the form of a two dimensional array.

Again, all available agents may be identified by row entries of data 216, while possible queues may be identified by column entries. As noted, queues are preferably identified in queue definition data 222. Each row/column intersection will preferably contain an entry identifying whether the agent associated with the row is assigned to the queue identified by the associated column. Each entry may for example be a binary entry. Thus, if an entry has a value of one(1) the agent is assigned to the queue; otherwise the agent is not assigned to the queue. Alternatively, and as illustrated in FIG. 4, each entry at each row/column intersection may assume a value indicative of a priority assigned to a queue for that agent. This value may be numerical and between, for example, zero (0) and forty-nine (49). If an agent is not (and cannot) be assigned to the queue identified by the column, the entry has a value of (0). If the agent may be assigned to the queue, but is currently not assigned, the entry will have a value of forty-nine (49) indicating the agent is standing by. Otherwise, the entry will have a value of between one (1) and forty eight (48), indicating a relative queue handling priority for the agent and the queue. That is, calls held in higher priority queues will be routed and processed by the agent in advance of other calls in other queues having lower assigned priorities. A value of one (1) indicates the highest call handling priority for that queue. As will be appreciated, other ranges of values or mappings could easily be used.

Unlike in conventional automatic call distribution centers, the queues, including their significance and number, are completely definable within system 10, by way of agent/queue assignment data 216, and do not have any pre-defined relationship to specific agent stations 34. As such, system 10 could, for example, be configured to have only a single queue. Agents may be seated at any physical terminal while being assigned to a particular queue. Additionally, agents at agent stations 34 may be assigned to multiple queues, as agents can typically process multiple types of calls, each having different call processing skill requirements. Thus, once a particular agent becomes available, that agent might be able to process any one of multiple calls in multiple queues, held at PBX 30. As well, agents may be re-assigned to varying queues, with varying priorities, as call center requirement vary over time.

FIG. 5 illustrates a possible arrangement of agent attributes data 228. Again, agent attribute data 228 may be stored as a two dimensional array. Each row within the array is associated with a single agent, as identified by the agent number. Each column in the array represents a call handling attribute that may or may not be possessed by an associated agent. The example agent attribute data may, for example, be indicative of an associated agent's ability to speak a particular language; the agent's ability to handle calls of a certain geographic origin; or the like. Most preferably the agent attributes are defined so that these attributes are relevant to all queues defined within data 222. Thus, attributes may be used to route calls to all assigned queues; moreover the attributes conveniently, and preferably, remain constant as an agent is re-assigned to various queues over time.

Figure 6:
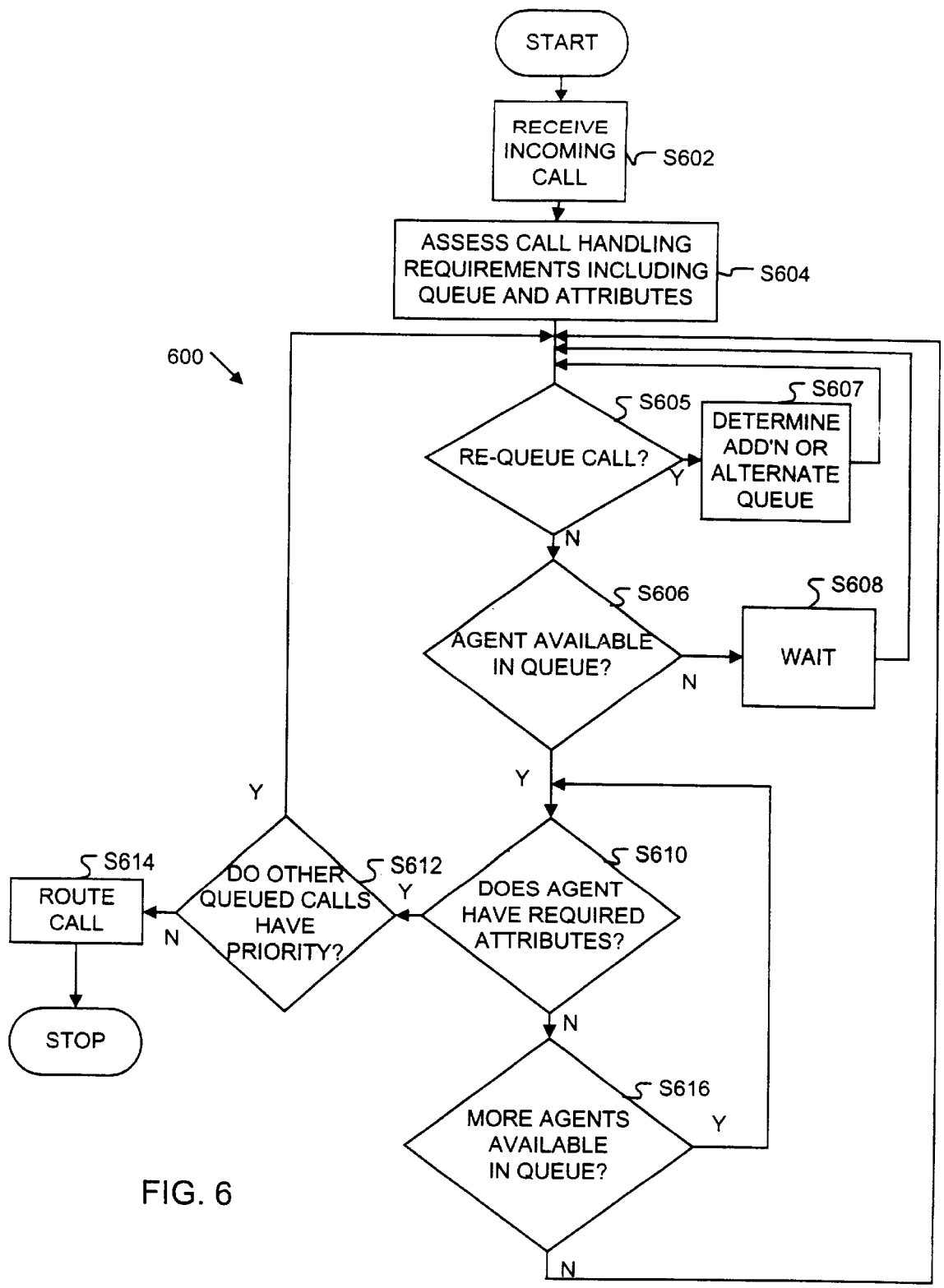
FIG. 6 illustrates steps performed by the communications center of FIG. 1, and exemplary of an embodiment of the present invention.

In operation, PBX 30 as illustrated in FIG. 1 receives calls originating with callers using equipment 22 interconnected with the PSTN 26, and performs steps 600 illustrated in FIG. 6. Steps 600 are performed for each call, and steps 600 may be performed concurrently numerous times by system 10.

Data for available agents has been pre-defined within memory 14. Available agents are at agent stations 34, and have notified server 12 of their availability by "logging in" or dialing in, signifying their presence, and identity at stations 34 in ways known to those skilled in the art.

Upon receipt of a call in step S602, call center server 12 in communication with PBX 30 determines call handling requirements in step S604. Call handling requirements will include determination of a specific agent queue for handling the call, as well as required agent attributes for proper handling of the call. Call handling requirements may be determined by prompting a caller for further information using, for example, an interactive voice response ("IVR") feature forming part of center 10; by called number; by calling number identified, for example, by an automatic number identification ("ANI") function preferably resident at PBX 30; or in other known ways. Once determined, call handling requirements as well as call statistics including time of call and the like, may be stored within data memory 14 as call data 232 (FIG. 2). Call handling requirement may be used to assess one or more suitable, secondary handling queues, having agents that may adequately be able to handle the call, but not as well as agents assigned to preferred handling queues.

Next, application software 16, assesses whether or not the call has been holding at center 10, for more than a threshold amount of time, in step S605. For example, if a call has been holding for more than five minutes, its immediate disposition may be of high priority. As such, software 16 may re-queue the call in step S605, by again comparing call handling requirements to secondary queues that, although not the preferred queue, may have assigned agents able to process the call. If such alternate secondary queues exist, the call may be added to an appropriate queue. Thereafter, steps S605 and onward are repeated. Center 10, may preferably be configured to include a "general" queue, to which various agents may be added to handle re-queued calls. As will be appreciated, calls that have been re-queued may iteratively be re-queued again, and thus added to more and more queues for ultimate handling of the call. Multiple threshold times for adding calls to additional queues may be used by call control software 202. Alternatively, after a threshold time the call could be disconnected, or forwarded to another call center.

Next, application software 16 compares available agent data as defined within status of agents data 212; and agent/queue assignment (current) data 216 in step S606 to locate an appropriate agent assigned to one of the queues to which the call has been queued. If no agent is available in the associated queues, software 16 waits a determined amount of time in step S608, and thereafter repeats step S606 and S608 until an agent in the determined queue becomes available. Once an agent assigned to the relevant queue is available at one of agent stations 34, call handling attributes of the call are compared with agent attributes stored within agent attribute data 228 in step S610. If the call handling attributes match those of the first available agent, and no previous other call in a queue with a higher assigned priority is holding at PBX 30, as indicated by status of queues data 214 and as determined in step S612, the incoming call is routed almost immediately from the queue to the associated agent at an agent station 34 by call control software block 202 using routing data 230 in step S614.

A call routed to an agent in step S614, may be routed with call information to the chosen agent which may be displayed at that agent's terminal. Status of agent data 212 is accordingly updated by call control software block 202 to indicate that agent is occupied, also preferably in step S614.

If the first available agent in the relevant queue does not possess the required attributes, attribute data 216 of any remaining available agents assigned to the queue are probed to assess whether an available agent possesses the required attributes by performing steps S616 and S610.

If a suitable agent is not immediately available, the call is held at PBX 30, using conventional techniques, and the status of queues data 214 is updated to reflect a waiting call in particular queues. Music, may for example, be played to occupy a waiting caller. Steps S605 and onward are repeated. Once an agent within a suitable queue becomes available, call handling attributes of the queued call are compared to agent attributes in step S610. If these match, the call is routed to the available agent in steps S612 and S614. The call is processed by the agent, and the status of queues data 214 and the status of agents data 212 are updated to reflect removal of a call from the queue and that the chosen agent is occupied. Once the call has been processed and the agent releases the call, that agent is again noted as free within the status of agents data 212 in memory 14 by status monitoring and statistics software block 200.

Additionally, call scheduling software control block 204, may use scheduling data to re-assign agents to other queues, using agent/queue assignment data (stored) 218 over time. Conveniently, as agent attribute data preferably applies to all queues to which an agent may be assigned, re-assignment of agent/queues does not require re-assignment of agent attributes, allowing for the easy administration of future agent to queue assignment.

Method steps 600 may be better appreciated with reference to an example. In an example call center 10, support calls for a variety of products such as computer printers, monitors, modems and motherboards are processed. As such, queues representing each of these products are defined as illustrated in FIG. 4. Agents are assigned to these queues, with the illustrated agent number "1", being assigned to three queues; agent "2" to a single queue; agent "3" to two queues; and agent "4" to three queues, as illustrated. As noted, assignment to queues is in order of call processing preference, with an agent assigned to two queues processing calls destined for the lower numbered queue before calls to the higher numbered queues. Further, the example call center 10 is configured to handle calls in languages English, German and French, and from multiple English speaking countries. Agents are staffed accordingly. As well, agent attributes indicating an ability to handle calls in a particular language or from a particular English speaking country are stored in agent attribute data 228, as illustrated in FIG. 5. Agent number "1", for example, has attributes indicating that agent "1" is able to handle calls in English, and French and originating in Canada or the USA.

Now, assume that a call for printer support from an English speaking caller in England is received at center 10 in step S602. The call handling requirements are assessed in step S604, by server 12 and PBX 30 by prompting the caller using an interactive voice response ("IVR") of center 12. The call is thus clearly destined for an agent in the printer queue. In the example, only agent numbers "1" and "4" are assigned to this queue. Assuming the call has not been held at server 12 beyond an acceptable threshold time, as determined in step S605, server 12 determines if agent number "1" or "4" is free, in step S606. If not, server 10 holds the call at PBX 30; waits in step S608; and repeats steps S606 and S608. Once agent number "1" or "4" becomes available server 12 determines if the agent has the required agent attributes to properly handle the call. In the example, the agent must speak English and be in a position to handle calls from England. Accordingly, if the available agent lacks all the required attributes as defined in data 228 (ie. example agent number "4" has not become available) steps S606 onward are repeated. Eventually, and assuming the call is not held beyond the threshold time, once agent number "4" becomes available, as determined in steps S606 and S610, a determination is made to ensure that no other call having a higher priority for agent "4" is holding at PBX 30. This is done by examining status of queues data 214. In the illustrated example, calls with higher priority may include support calls for motherboards. If a call with a higher priority is holding, steps S606 and onward are repeated, until eventually the call is processed.

While the organization of steps, software blocks, data and data structures have been illustrated as clearly delineated, a person skilled in the art will appreciate that the delineation between steps, blocks and data is somewhat arbitrary. Numerous other arrangements of steps, software blocks and data are possible.

Similarly, as already noted, while the above described preferred embodiment has been described in the context of a telephony call center interconnected with the PSTN, the invention may be used in analogous communications handling centers. For example, the invention may be used as part of a voice over internet protocol call center server; as part of an internet multimedia message response center; as part of an electronic mail response center; or the like. In such embodiments, agent stations would accordingly include sufficient equipment, such as multimedia terminals, or the like to allow proper agent handling of an incoming communication. Similarly, handling requirements for incoming communications could be determined in numerous ways, including using information within the communication, including a header accompanying the communication, or its content.

Finally, it will be understood that the invention is not limited to the embodiments described herein which are merely illustrative of a preferred embodiment of carrying out the invention, and which are susceptible to modification of form, arrangement of parts, steps, details and order of operation. The invention, rather, is intended to encompass all such modifications within its spirit and scope, as defined by the claims.

What is claimed is:

1. A method of operating a communications handling center, for forwarding incoming communications to associated handling agents, said method comprising:
   a. assigning each of said agents to at least one communications handling queue, and at least one of said agents to at least two communications handling queues, each queue for handling communications of a particular subject matter;
   b. assigning to at least one of said agents at least one agent attribute, indicative of that agent's ability to handle communications in queues to which that agent is assigned;
   c. receiving an incoming communication at said center;
   d. determining multiple handling requirements of said incoming communication, including at least one appropriate handling queue, and required agent attributes for said communication;
   e. assigning said incoming communication to said at least one appropriate handling queue;
   f. comparing said required agent attributes for said incoming communication, with agent attributes of agents within said at least one appropriate handling queue to identify an available agent assigned to said at least one appropriate handling queue having all of said required agent attributes for said incoming communication; and
   g. forwarding said incoming communication to said available agent assigned to said at least one appropriate handling queues and having all of said required agent attributes.

2. The method of claim 1, wherein said at least one agent attribute assigned is indicative of an agent's ability to handle communications in all queues to which that agent is assigned.

3. The method of claim 1, wherein said forwarding comprises
   i. locating an available agent assigned to an appropriate queue;
   ii. determining if said available agent has all said required agent attributes for said communication;
   iii. locating a next available agent assigned to one of said appropriate handling queues, if a previous available agent lacks all said required agent attributes for said communication;
   iv. repeating ii. and iii. until an agent having all required agent attributes is located, for all available agents assigned to said appropriate handling queue.

4. The method of claim 1, wherein assigning each of said agents to at least one handling queue of agents comprises assigning a handling priority for each said queue to which an agent is assigned, whereby communications for handling queues with higher assigned priorities are forwarded to an agent in advance of communications for handling queues with lower assigned priorities.

5. The method of claim 1, further comprising re-assigning said agents to future queues after a determined amount of time and repeating c. to e.

6. The method of claim 1, wherein attributes assigned to an agent represent languages spoken by said agent.

7. The method of claim 1, further comprising, prior to g., determining at least one additional appropriate communications handling queue for said communication, if said communication has not been forwarded to an available agent after a determined time.

8. A call center, in communication with a communications network, for routing incoming calls to associated call handling agents, said call center comprising:
   a. a processor;
   b. processor readable memory in communication with said processor, storing
      i) data representing a current assignment of each call handling agent to at least one call handling queue, and at least one agent to two call handling queues;
      ii) data representing call handling attributes possessed by at least one of said handling agents;
      iii) data representing a future assignment of each call handling agent to at least one call handling queue;
      iv) scheduling data representative of when a future assignment of each call handling agent to at least one call handling queue should be assigned to an agent;
      v) processor executable instructions, adapting said call center to
         a. determine call handling requirements, including at least one appropriate call handling queue and required agent call handling attributes required for processing an incoming call;
         b. forward said incoming call to an associated available agent assigned to an appropriate queue, having all said required call handling attributes;
         c. assign each agent to queues as defined in said data representing future assignment of each call handling agent in accordance with said scheduling data.

9. The center of claim 8, wherein said processor executable instructions, further adapt said call center to
   assign said incoming call to said at least one appropriate call handling queue; and
   compare said required agent attributes for said incoming call, with agent attributes of agents within said at least one appropriate handling queue to identify an available agent assigned to said at least one appropriate handling queue having all of said required agent attributes for said incoming call and thereby forward said incoming call.

10. A method of forwarding an incoming call at a telephone call center to a call handling agent, said method comprising:
   a. receiving an incoming call;
   b. determining multiple call handling requirements of said incoming call, including an appropriate call handling queue, and required agent attributes for said call;
   c. comparing said call handling requirements to
      i.) agent assignments stored at said call center, assigning each of said agents to at least one call handling queue, and at least one of said agents to at least two call handling queues, each queue for handling calls of a particular subject matter; and ii.) agent attributes, stored at said call center indicative of an agent's ability to handle calls in queues to which that agent is assigned;

d. forwarding said call to an available agent assigned to said appropriate queue and having attributes required to handle said call assigned to said agent, based on comparing said call handling requirements.

11. A telephone call center for routing incoming telephone calls to one of several associated call handling agents, comprising:

a. means to store agent to queue assignments, assigning each of said agents to at least one call handling queue, each queue for handling calls of a particular subject matter;

b. means to store at least one agent attribute for at least one agent, said attribute indicative of that agents ability to handle calls in queues to which that agent is assigned;

c. means to receive an incoming call;

d. means to determine multiple call handling requirements of said incoming call, including an appropriate call handling queue, and required agent attributes for said call;

e. means to assign said incoming call to said appropriate queue;

f. means to compare said required agent attributes for said incoming call to attributes of agents in said appropriate queue stored in said means to store, to identify agents in said appropriate queue capable of processing said call g. means to connect said call to an available agent assigned to said appropriate queue and having attributes required to handle said call, as determined by said means to compare.

12. A method of operating a telephone call center, for routing incoming telephone calls to associated call handling agents, said method comprising:

a. assigning each of said agents to at least one call handling queue, each queue for handling calls of a particular subject matter;

b. assigning to each of said agents at least one agent attribute, indicative of that agent's ability to handle calls in queues to which that agent is assigned;

c. receiving an incoming call;

d. determining multiple call handling requirements of said incoming call, including an appropriate call handling queue, and at least two required agent attributes for said call e. assigning said incoming call to said appropriate queue;

f. comparing said agent attributes for said call to agent attributes of agents within said appropriate queue to identify an available agent assigned to said appropriate queue, having all of said required agent attributes; and g. forwarding said call to said available agent assigned to said appropriate queue and having all of said attributes required to handle said call assigned to said available agent.

* * * * *

UNITED STATES PATENT AND TRADEMARK OFFICE
CERTIFICATE OF CORRECTION

PATENT NO.    : 6,314,177 B1
DATED         : November 6, 2001
INVENTOR(S)   : Sheldon Joseph Davis et al.

It is certified that error appears in the above-identified patent and that said Letters Patent is hereby corrected as shown below:

<u>Title page,</u>
Item [75], Inventors should read -- Sheldon Joseph Davis, Guelph, Canada; Michael P. Montemurro, Toronto, Canada; Jonathan Crowther, Sunnyvale, CA; Sandra Wright, Toronto, Canada --.

Signed and Sealed this

Twenty-fourth Day of December, 2002

JAMES E. ROGAN
*Director of the United States Patent and Trademark Office*